(12) United States Patent
Su et al.

(10) Patent No.: US 7,540,485 B2
(45) Date of Patent: Jun. 2, 2009

(54) PAPER FEEDING APPARATUS

(75) Inventors: Yu-Jen Su, Taipei (TW); Liang-Qing Su, Renwu Township, Kaohsiung County (TW)

(73) Assignee: Lite-On Technology Corporation, Taipei (TW)

( * ) Notice: Subject to any disclaimer, the term of this patent is extended or adjusted under 35 U.S.C. 154(b) by 252 days.

(21) Appl. No.: 11/653,989

(22) Filed: Jan. 17, 2007

(65) Prior Publication Data

US 2008/0042339 A1     Feb. 21, 2008

(30) Foreign Application Priority Data

Aug. 18, 2006     (TW) ............................. 95130491 A

(51) Int. Cl.
   *B65H 5/00*     (2006.01)
(52) U.S. Cl. .............. 271/10.05; 271/10.09; 271/10.11; 271/114
(58) Field of Classification Search ............. 271/10.05, 271/10.09, 10.11, 114
See application file for complete search history.

(56) References Cited

U.S. PATENT DOCUMENTS

| | | | |
|---|---|---|---|
| 5,430,536 A | 7/1995 | Fullerton et al. | |
| 5,680,204 A | 10/1997 | Ferrara | |
| 5,755,435 A * | 5/1998 | Fujiwara | ..................... 271/4.04 |
| 6,032,949 A | 3/2000 | Ando et al. | |
| 6,563,611 B1 | 5/2003 | Kao et al. | |

* cited by examiner

*Primary Examiner*—David H Bollinger
(74) *Attorney, Agent, or Firm*—Rabin & Berdo, P.C.

(57) ABSTRACT

A paper feeding apparatus including a paper pickup roller assembly, a paper conveying roller assembly, a one-way driving assembly, and a reverse driving assembly is provided. The one-way driving and the reverse driving assembly are connected to a driving device, such as a motor, wherein the one-way driving assembly is engaged with the paper pickup roller assembly only in one direction to drive the paper pickup roller assembly forward as the driving device rotates forward and stop driving the paper pickup roller assembly as the driving device rotates backward, and the reverse driving assembly is provided for driving the paper conveying roller assembly to constantly rotate forward for conveying the paper sheet to move forward no matter whether the driving device rotates forward or backward.

13 Claims, 9 Drawing Sheets

PAPER FEEDING APPARATUS

CROSS-REFERENCE TO RELATED APPLICATIONS

This non-provisional application claims priority under 35 U.S.C. § 119(a) on Patent Application No(s). 095130491 filed in Taiwan, R.O.C. on Aug. 18, 2006, the entire contents of which are hereby incorporated by reference.

BACKGROUND OF THE INVENTION

1. Field of Invention

The present invention relates to a paper pickup and feeding apparatus, and more particularly, to a paper feeding apparatus for flipping a double-sided document sheet to scan or print both sides of the sheet, and maintaining paper feeding speed as scanning or printing a one-sided document sheet.

2. Related Art

In a printing apparatus having a single printing module, only one side of a paper sheet is printed at one time, when both sides of a paper sheet need to be printed, the paper sheet must be fed again after the printing of one side of the paper is complete, so as to print the other side of the paper sheet. In a scanning apparatus having a single scanning module, the process of double side scanning is similar, that is, one side of the paper sheet has to be scanned first before the other side is scanned.

In early double side printing or scanning method, the paper is flipped manually by a user and then fed into the paper feeding track again after one side has been printed or scanned, so as to perform the printing or scanning of the other side. However, this method is complex, and the printing or scanning directions of two sides of the paper are often different because of wrong manual operations. Therefore, in order to facilitate the double side scanning or printing and avoid problems caused by manual paper flipping, various paper feeding apparatuses have been proposed, in which a paper can be flipped automatically to pass through the printing or scanning module again after the printing or scanning of one side of the paper is complete, so as to perform the printing or scanning of the other side. For example, U.S. Pat. No. 5,430,536, No. 5,680,204, and No. 6,563,611 are paper feeding apparatuses for flipping the paper sheet to perform the double side printing or scanning.

In U.S. Pat. No. 5,430,536, an intersected path connects the front and rear sections of the paper feeding path. After the first side of the paper sheet is printed or scanned, the paper feeding apparatus reverses to move the paper sheet back, such that the paper returns to the original paper feeding path through the intersected path, such that the second side of the paper sheet is printed or scanned. Using the intersected path to reverse the paper sheet leads the paper sheet to pass the paper feeding path twice before the paper is flipped to be printed or scanned on both sides.

In U.S. Pat. No. 5,680,204, two scanning or printing modules are disposed on both sides of the paper feeding path to scan or print both sides of a paper sheet at the same time. However, though the paper feeding apparatus is simplified, two scanning or printing modules are used, thus greatly increase the cost.

In U.S. Pat. No. 6,032,949, a flipping path is used to flip the paper with the other side facing the scanning or printing module to complete the scanning or printing after the paper passes through the scanning or printing module. However, as the paths of the paper entering and leaving the paper feeding track are the same one, the paper feeding track can carry only one paper sheet at one time. When the single side of a paper sheet is scanned or printed, the paper feeding speed is lowered due to that another paper sheet is not allowed to entering the paper feeding track. In other words, the paper feeding speed of one-side scanning or printing is greatly influenced.

As conventional paper feeding apparatuses for double side scanning or printing have problems of low paper feeding speed or high cost, it has become the most important technical subject to improve the paper feeding speed and to reduce the cost.

SUMMARY OF THE INVENTION

Conventional paper feeding apparatuses for double side scanning and printing have problems of low paper feeding speed or high cost. In view of the above problems, the object of the present invention aims to provide a paper feeding apparatus capable of improving the paper feeding speed and thus improving the scanning or printing speed of the scanner or printer.

In order to achieve the aforementioned object, a paper feeding apparatus of the present invention is provided, which is disposed in a base including a paper feeding track, wherein a driving device is disposed in the base for driving the paper feeding apparatus. The paper feeding apparatus includes a paper pickup roller assembly, a one-way driving assembly, a paper conveying roller assembly, and a reverse driving assembly.

The paper pickup roller assembly is disposed at an entrance end of the paper feeding track for picking up a paper sheet into the paper feeding track.

The one-way driving assembly is connected to the driving device, and is driven by the driving device. The one-way driving assembly is engaged with the paper pickup roller assembly only in one direction to drive the paper pickup roller assembly forward as the driving device rotates forward so as to pick up the paper sheet into the paper feeding track, and stop driving the paper pickup roller assembly as the driving device rotates backward so as to stop picking up the paper as the driving device rotates backward.

The paper conveying roller assembly is disposed along the paper feeding track for conveying the paper sheet to move forward in the paper feeding track.

The reverse driving assembly is connected to the driving device, and is driven by the driving device. The reverse driving assembly is provided for constantly driving the paper conveying roller assembly to rotate forward and drive the paper sheet to continuously move forward in the paper feeding track. The reverse driving assembly drives the paper conveying roller assembly to rotate forward to drive the paper sheet to move forward, and continuously drives the paper conveying roller assembly to rotate forward to drive the paper to move forward as the driving device rotates backward. Therefore, no matter whether the driving device rotates forward or backward, the paper conveying roller assembly can rotate forward to drive the paper sheet to move forward in the paper feeding track.

The efficacy of the present invention is that the combination of the one-way driving assembly and the reverse driving assembly i.e., the forward or backward rotation of the driving device is used to change the one-side or duplex scanning mode, and maintain the paper feeding speed of the paper feeding apparatus by keeping the paper moving forward continuously without moving backward. Meanwhile, when the one-side scanning or printing is performed, the paper sheets can be picked up continuously and sequentially to keep the space between two sheets of paper, thereby improving the efficiency of the one-side scanning or printing.

The features and advantages of the present invention are described in detail in the following embodiments, and the technical content of the present invention is apparent to those skilled in the art and can be implemented by those skilled in the art with reference to the description. The spirit and scope of the invention will become apparent to those skilled in the art from this detailed description of the embodiments, the claims, and the drawings.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

To make the object, structure, features and function of the present invention apparent, the present invention is illustrated in detail below with reference to the embodiments.

Figure 1:
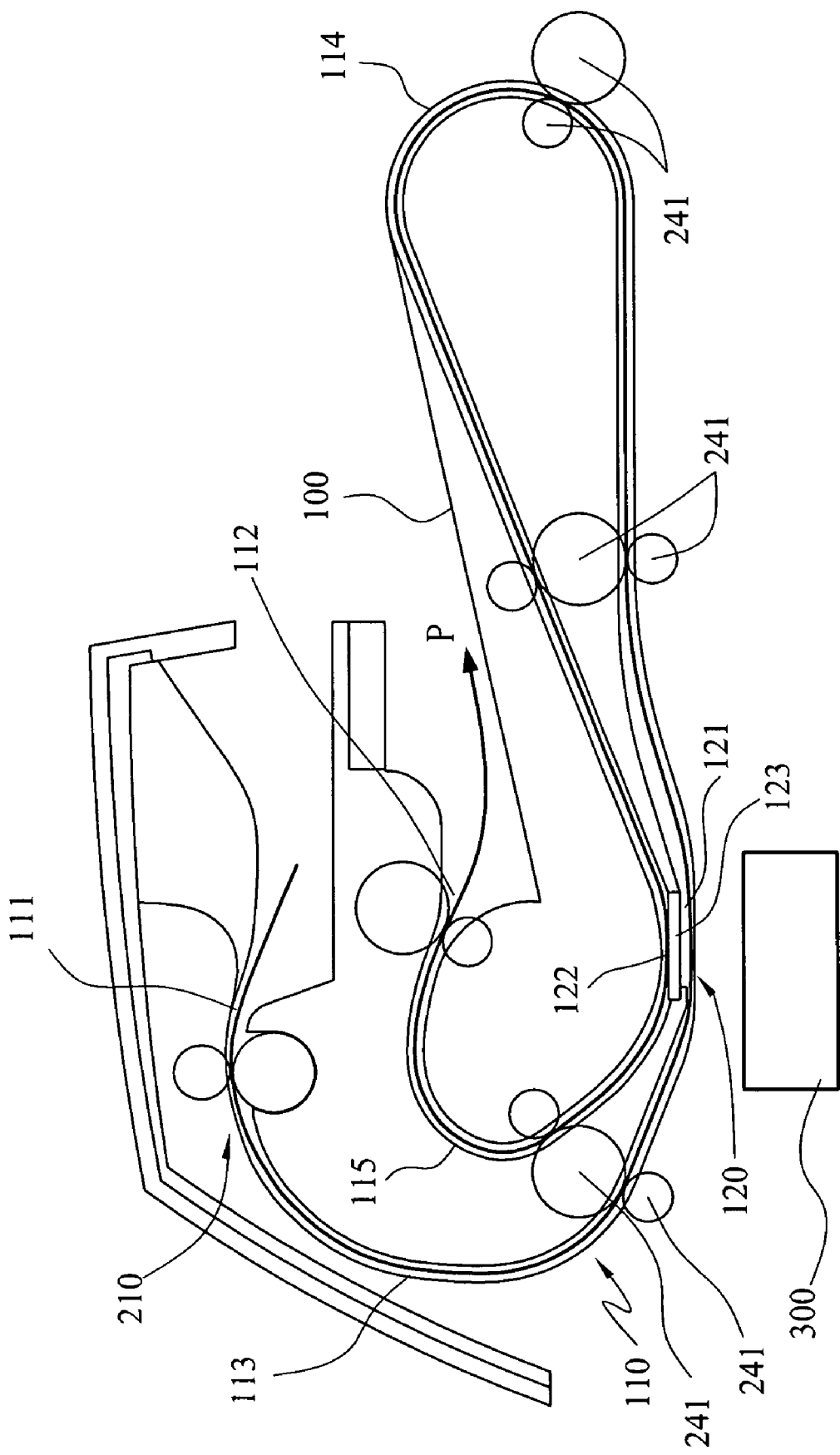
FIG. 1 is a schematic view of an embodiment of the present invention.

Referring to FIG. 1, a paper feeding apparatus according to an embodiment of the present invention is provided. The paper feeding apparatus is disposed in a base 100. The base 100 is, but not limited to, a scanner or a printer. The base 100 includes a paper feeding track 110 defined therein, wherein the paper feeding track 110 is provided for a paper sheet P moving forward therein and passes over a working area 120 defined the base 100 with the first side facing the working area 120. Then the paper sheet P passes over the working area 120 again with the second side facing the working area 120 after the paper sheet P passes through a return path. Thus, the first side and the second side of the paper sheet P can be scanned or printed in the working area 120. A scanner is taken as an example to illustrate the embodiment of the present invention. However, the paper feeding apparatus disclosed in the present invention is not limited to being disposed in the scanner. Instead, it can also be applied in a printer or a multi-function peripheral (MFP).

The paper feeding track 110 is extended over one side of the working area 120, and a scanning module 300 is disposed on the other side of the working area 120 for scanning the paper sheet P passing over the working area 120. The paper feeding track 110 includes an entrance end 111 and an exit end 112. The paper sheet P enters the paper feeding track 110 via the entrance end 111, and leaves the paper feeding track 110 via the exit end 112. The paper feeding track 110 is divided into three sections, namely, an entrance section 113, a flipping section 114, and an exit section 115. One end of the entrance section 113 is connected to entrance end 111 for the paper sheet P to enter, and the other end of the entrance section 113 is connected to the working area 120. On the other hand, one end of the exit section 115 is connected to the working area 120, while the other end of the exit section 115 is connected to the exit end 112 for the paper sheet P to leave the paper feeding track 110. And, two end of the flipping section 114 are both connected to the working area to serve as a return path. A transparent partition 123 is disposed above the working area 120 to separate the space above the working area 120 into a first scanning area 121 and a second scanning area 122, while two ends of the flipping section 114 are connected to the entrance section 113 and the exit section 115 via the first scanning area 121 and a second scanning area 122 respectively. That is, after entering the entrance section 113 of the paper feeding track 110 via the entrance end 111, the paper sheet P passes over the working area 120 through the first scanning area 121, with the first side facing the working area 120 to be scanned. Then after entering the flipping section 114 and keeping moving, the paper sheet P passes over the working area 122 again through the second scanning area 122, with the second side leaning on the transparent partition and facing the working area 120 to be scanned. Afterward, the paper sheet P enters the exit section 115, and leaves the paper feeding track 110 via the exit end 112.

Figure 2:
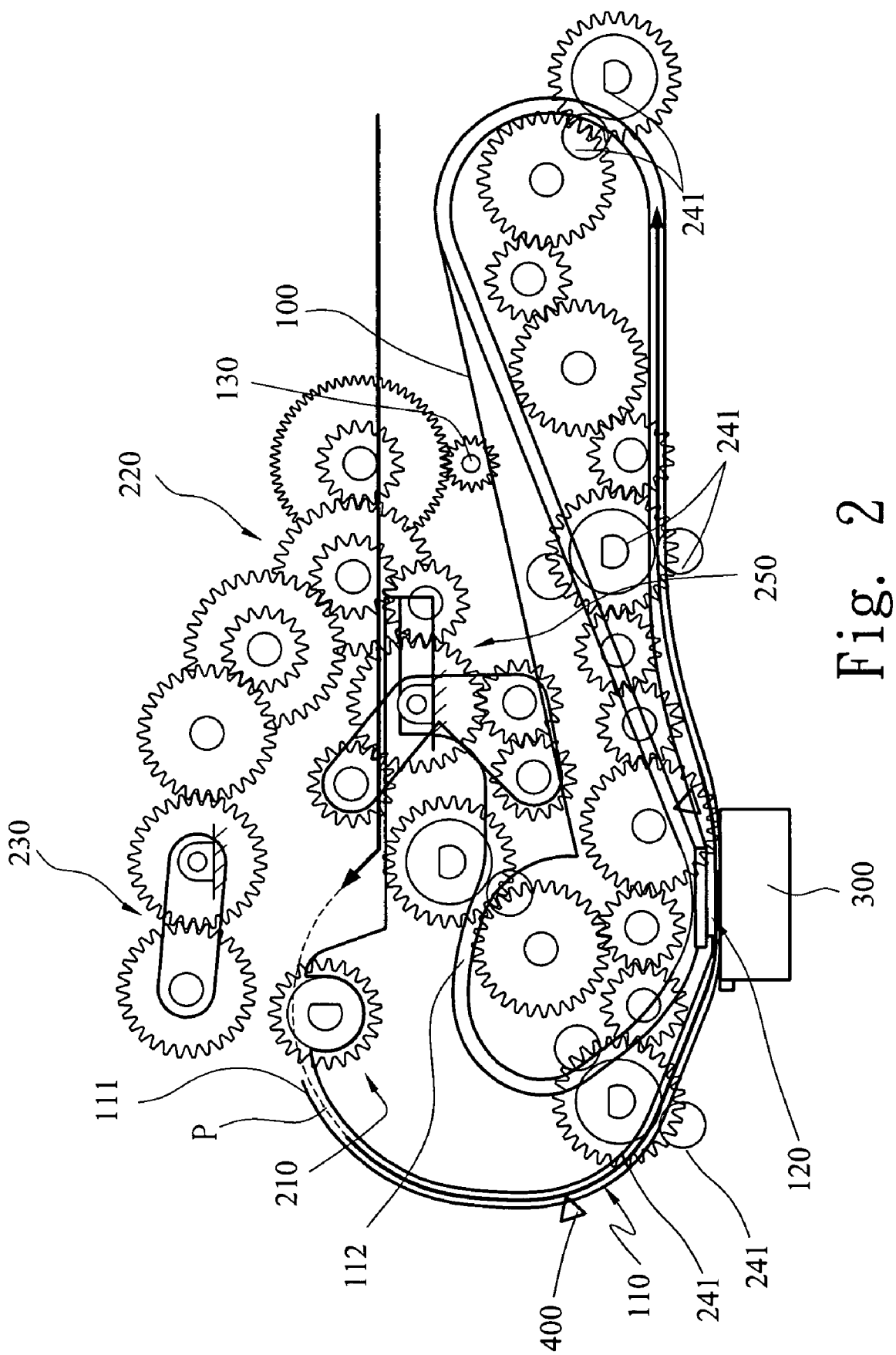
FIGS. 2, 3, and 4 are side views of the embodiment of the present invention.
Figure 3:
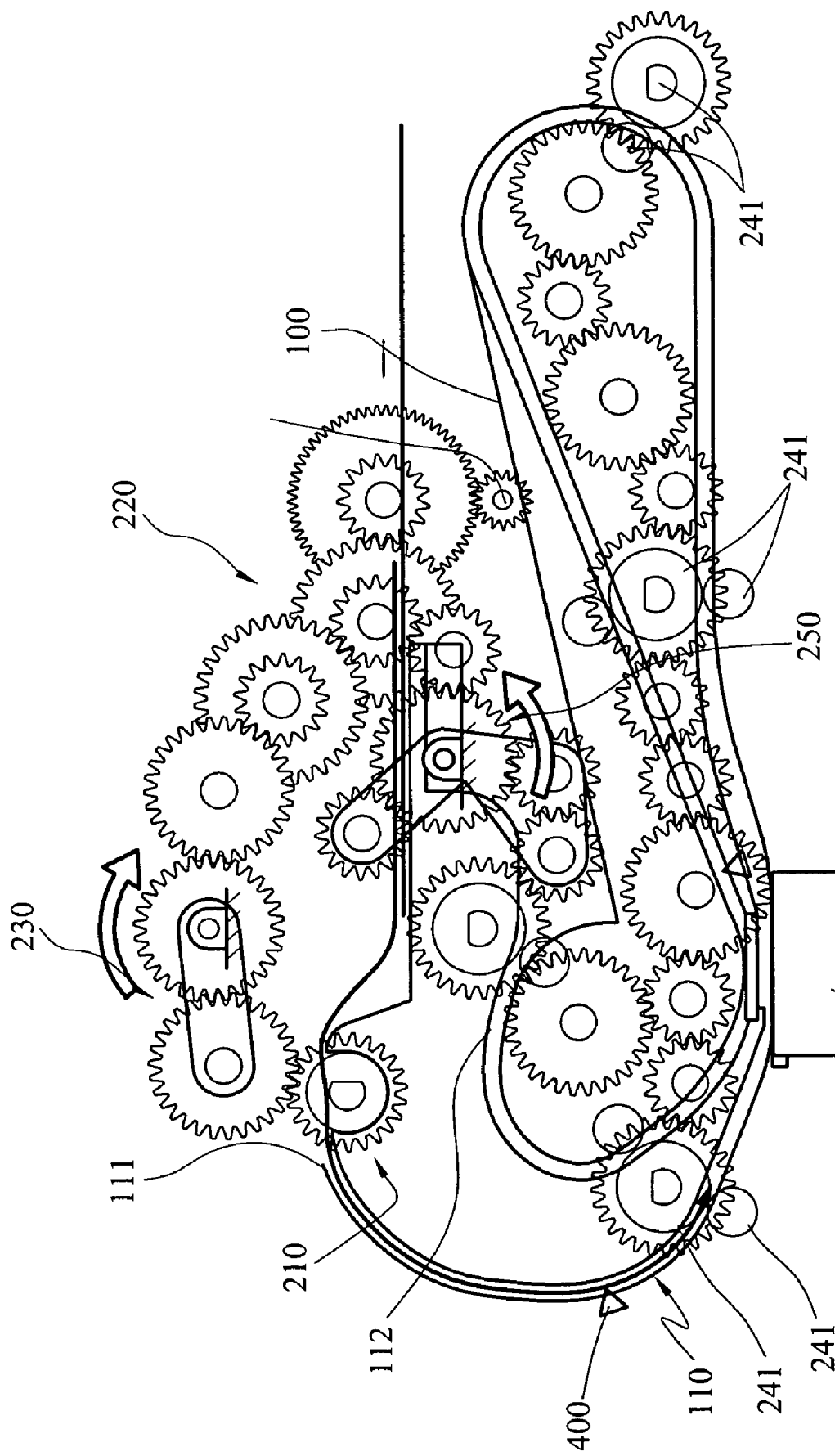
Figure 4:
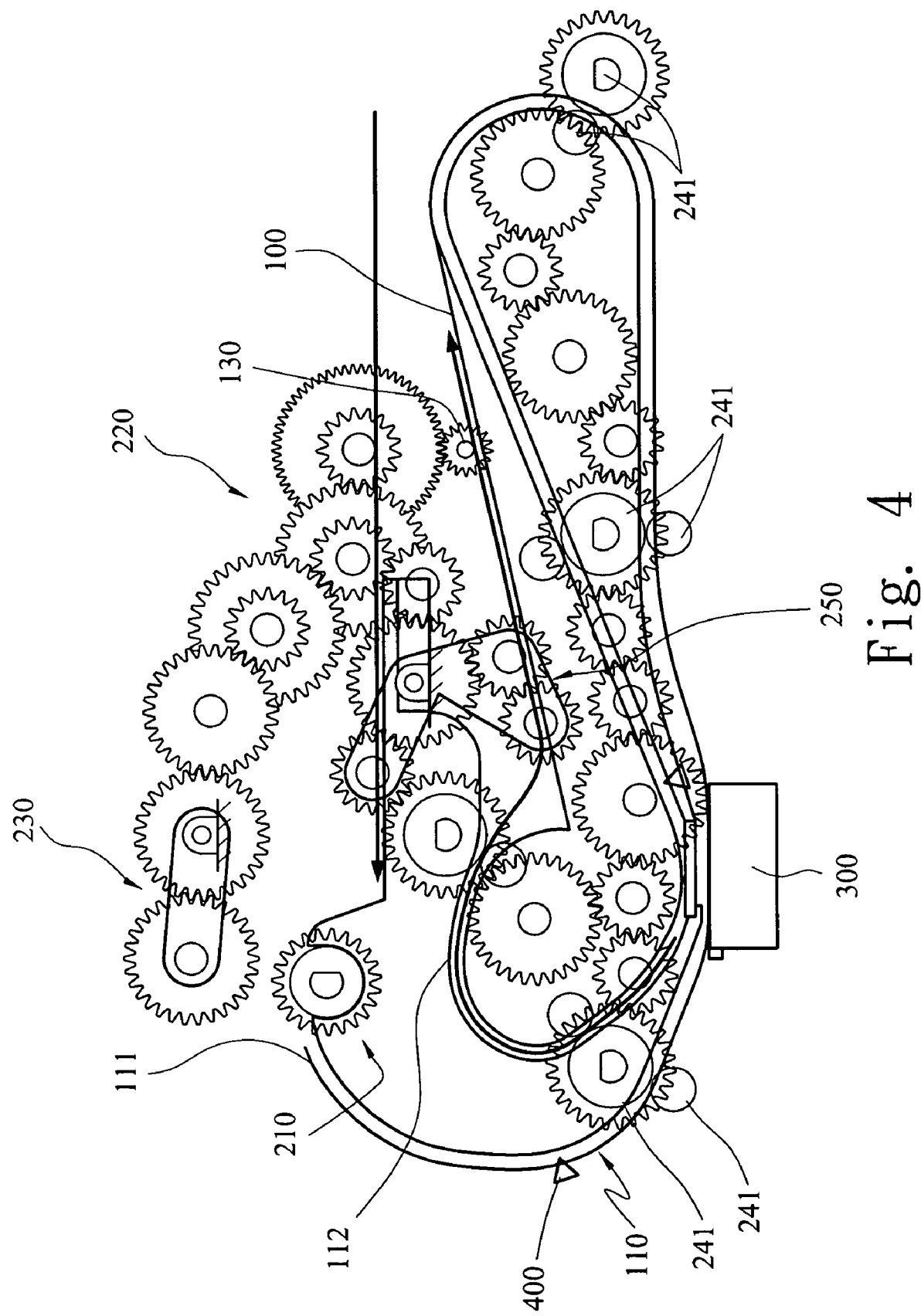

Referring to FIGS. 2, 3, and 4, in order to pickup and convey the paper sheet P, a driving device 130 is disposed in the base 100 for driving the paper feeding apparatus, so as to make the paper sheet P enter the paper feeding track 110 via the entrance end 111 and leave the paper feeding track 110 via the exit end 112. The paper feeding apparatus includes a paper pickup roller assembly 210, a power transmission assembly 220, a one-way driving assembly 230, a paper conveying roller assembly, and a reverse driving assembly 250.

The paper pickup roller assembly 210 is disposed at the entrance end 111 of the paper feeding track 110 for picking up the paper sheet P into the paper feeding track 110.

The power transmission assembly 220 includes a plurality of reduction gears 221, and is connected to the driving device 130, so as to perform forward or backward output power through the driving of the driving device 130. Meanwhile, the matching of the reduction gears 221 improves the torque output from the driving device 130, and changes the rotational speed of the output. The reduction gears 221 of the power transmission assembly 220 have different reduction ratios to produce a rotational speed difference. Through the engagement between different reduction gears 221 and the one-way driving assembly 230 and the reverse driving assembly 250 respectively, the one-way driving assembly 230 and the reverse driving assembly 250 have different rotational speed to meet the requirements for different paper pickup speed and paper feeding speed.

Figure 5:
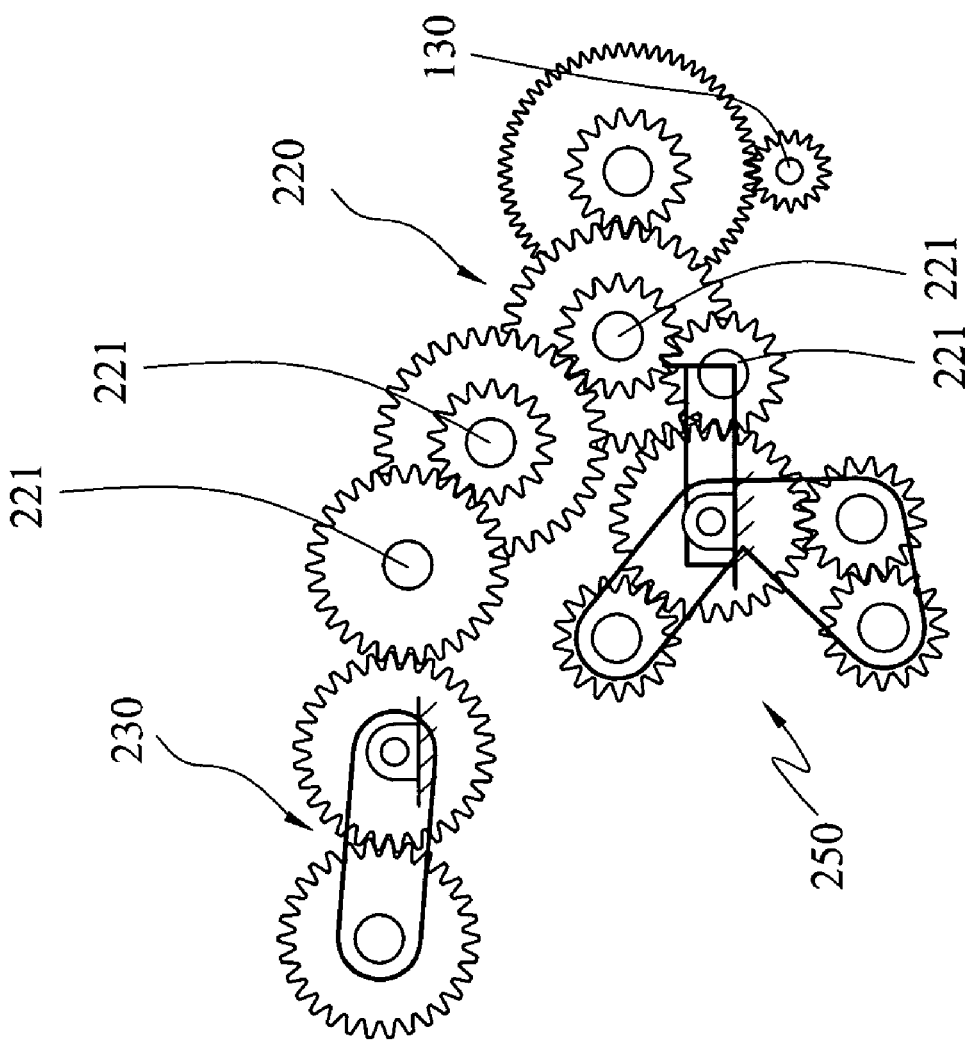
FIG. 5 is a side view of a part of the embodiment of the present invention.
Figure 6A:
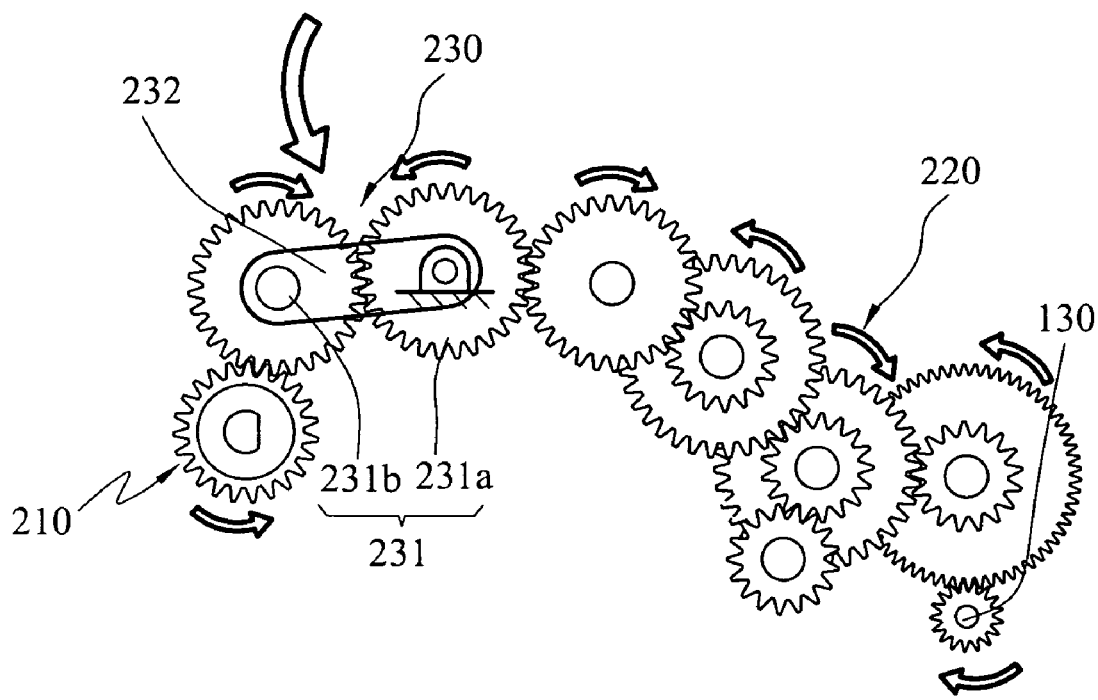
FIGS. 6A and 6B are schematic views of the operation of the one-way driving assembly according to the embodiment of the present invention.
Figure 6B:
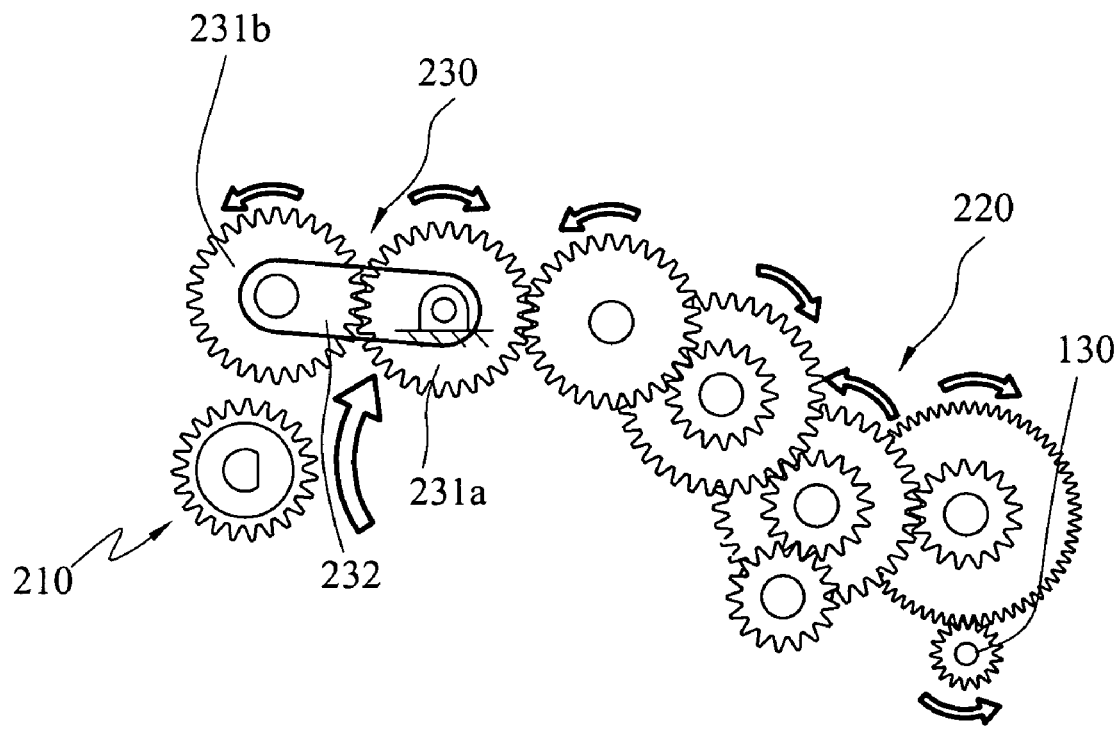

Referring to FIGS. 5, 6A, and 6B, the power transmission assembly 220 connects the one-way driving assembly 230 to the driving device 130, and is driven by the driving device 130 to be engaged with the paper pickup roller assembly 210 only in one direction, such that the paper pickup roller assembly 210 can be driven only in one direction to pickup that the paper sheet P from a paper tray into the paper feeding track 110, and will not be driven reversely to eject the paper sheet P. The one-way transmission assembly 230 includes a clutch gear assembly 231 and an arm 232. The clutch gear assembly 231 is disposed on the arm 232, and is constantly connected to the driving device 130 through the power transmission assembly 220. The clutch gear assembly 231 includes a first clutch gear 231a and a second clutch gear 231b. The first clutch gear 231a and the second clutch gear 231b are pivotally connected to the arm 232, and are engaged with each other. One end of the arm 232 is pivotally connected to the base 100, and swings relative to the base 100. The first clutch gear 231a is engaged with the power transmission assembly 220, and the first clutch gear 231a and the arm 232 are coaxially connected to the base 100, such that the first clutch gear 231a and the arm 232 rotate coaxially. As the driving device 130 rotates forward to drive the one-way driving assembly 230, the first clutch gear 231a of the clutch gear assembly 231 is driven by the power transmission assembly 220, so that the arm 232 swings toward the paper pickup roller assembly 210 to drive the second clutch gear 231b to move toward the paper pickup roller assembly 210. Thus, the second clutch gear 231b of the one-way driving assembly 220 is selectively engaged with the paper pickup roller assembly 210. As the one-way driving assembly 220 is engaged with the paper pickup roller assembly 210, the paper pickup roller assembly 210 is driven to rotate forward to pickup the paper sheet P from the paper tray to enter the paper feeding track 110 via the entrance end 111. When the driving device 130 rotates backward, the arm 232 is driven to swing backward, such that the second clutch gear 231b is disengaged from the paper pickup roller assembly 210. Thus, the paper pickup roller assembly 210 is disengaged with the one-way driving assembly 230, and the paper sheet P will not be driven to move backward as the driving device 130 rotates backward. That is, the one-way driving assembly 230 drives the paper pickup roller assembly 210 only in one direction to rotate forward, and does not drive the paper pickup roller assembly 210 to rotate backward.

In this embodiment of the present invention, the paper pickup roller assembly 210 rotates forward as the driving device 130 rotates forward, and does not rotate as the driving device 130 rotates backward.

Referring to FIGS. 1 and 2, the paper conveying roller assembly has a plurality of paper conveying rollers 241 and a plurality of relay gears. The paper conveying rollers 241 are arranged along the paper feeding track 110, so as to drive the paper sheet P to move forward in the paper feeding track 110. The relay gears are used to connect various paper conveying gears 241, such that the paper conveying gears 241 rotate synchronously to drive the paper sheet P to move forward.

Figure 7A:
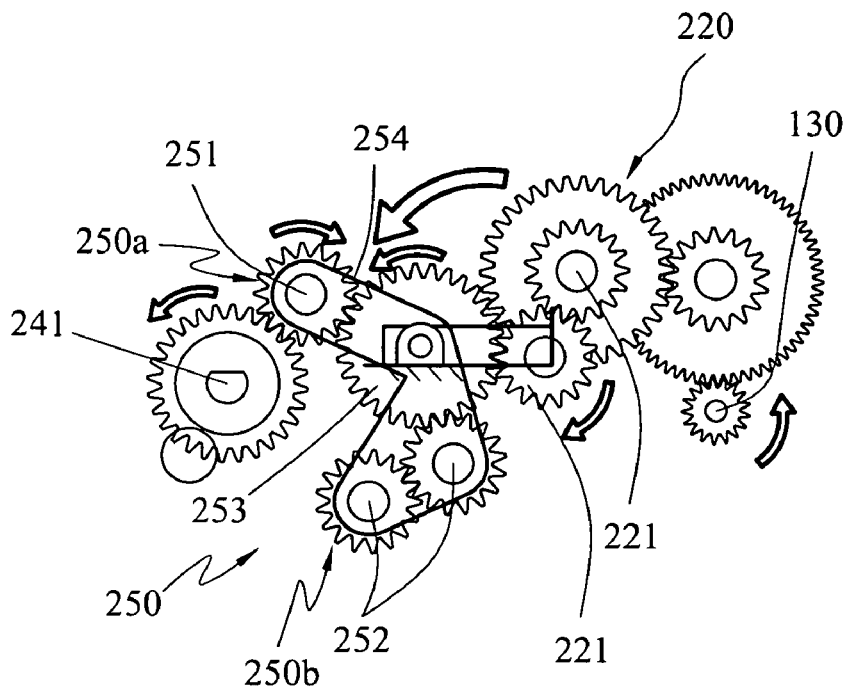
FIGS. 7A and 7B are schematic views of the operation of the reverse driving assembly according to the embodiment of the present invention.
Figure 7B:
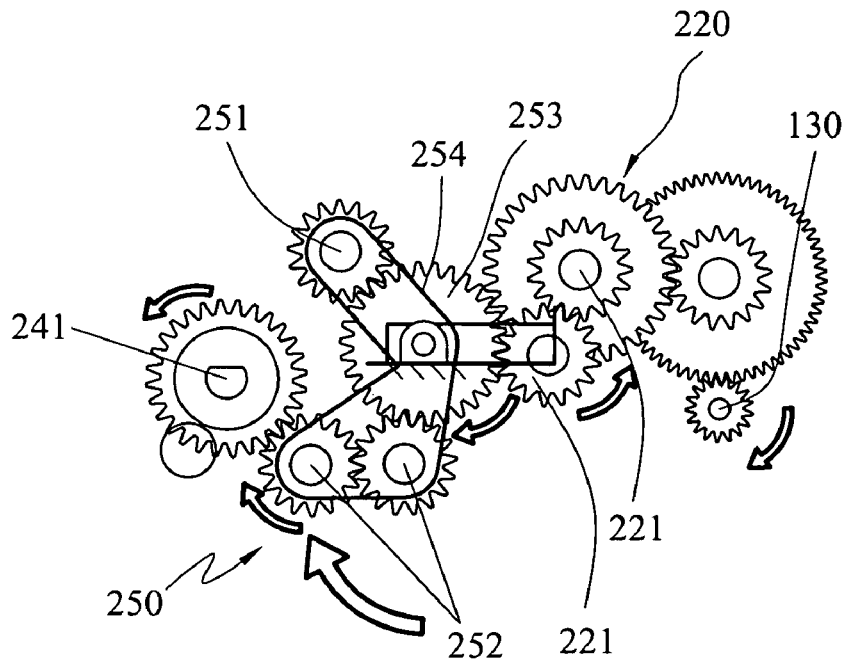

Referring to FIGS. 5, 7A, and 7B, the reverse driving assembly 250 is connected to the driving device 130 via the power transmission assembly 220, and is driven by the driving device 130 for constantly driving the paper conveying roller assembly to rotate forward. The reverse driving assembly 250 has a first output end 250a and a second output end 250b that have rotational output in opposite directions. When the driving device 130 rotates forward and backward, the first output end 250a and the second output end 250b are alternatively engaged with the paper conveying roller assembly, such that the paper conveying rollers 241 constantly rotates forward.

The reverse driving assembly 250 has a first reverse gear 251, two second reverse gears 252, a driven gear 253, and a gear seat 254. The gear seat 254 is pivotally connected to the base 100 for swinging relative to the base 100. The first reverse gear 251, the two second reverse gears 252, and the driven gear 253 are pivotally connected to the gear seat 254. The driven gear 253 and the gear seat 251 are coaxially connected to the base 100, such that the driven gear 253 and the gear seat 254 rotate coaxially, and the driven gear 253 is connected to the driving device 130 through the power transmission assembly 220. The first reverse gear 251 is pivotally connected to one end of the gear seat 254, and is engaged with the driven gear 253, to serve as the first output end 250a of the reverse driving assembly 250. The second reverse gears 252 are pivotally connected to the other end of the gear seat 254, and the two second reverse gears 252 are engaged with each other. Moreover, one of the two reverse gears 252 is engaged with the driven gear 253, and the other second reverse gear 252 rotates in the direction opposite to the first reverse gear 251 does to serve as the second output end 250b, such that two ends of the gear seat 254 forms the first output end 250a and the second output end 250b with rotational outputs in opposite directions.

Referring to FIG. 7A, when the driving device 130 rotates forward, the driven gear 253 drives the first reverse gear 251 and the second reverse gears 252 to rotate and move, and drives the gear seat 254 to swing, such that the first reverse gear 251 serving as the first output end 250a is engaged with the paper conveying rollers 241 or the relay gears engaged with the paper conveying roller assembly, so as to drive the paper conveying roller assembly to rotate forward to drive the paper sheet P to move forward.

Referring to FIG. 7B, when the driving device 130 rotates backward, the driven gear 253 drives the first reverse gear 251 and the second reverse gears 252 to rotate and move, and the gear seat 254 swings backward, such that the second reverse gear 252 serving as the second output end 250b is engaged with the paper conveying rollers 241 or the relay gears of the paper conveying roller assembly, so as to drive the paper conveying roller assembly to rotate forward to drive the paper sheet P to move forward when the driving device 130. As the rotational output directions of the first output end 250a and the second output end 250b are opposite, when the driving device 130 rotates forward or backward, the first output end 250a and the second output end 250b are alternatively connected to the paper conveying roller assembly, such that the paper conveying rollers 241 in the paper conveying roller assembly constantly rotate forward, so as to drive the paper sheet P to move forward in the paper feeding track 110 continuously.

Figure 8A:
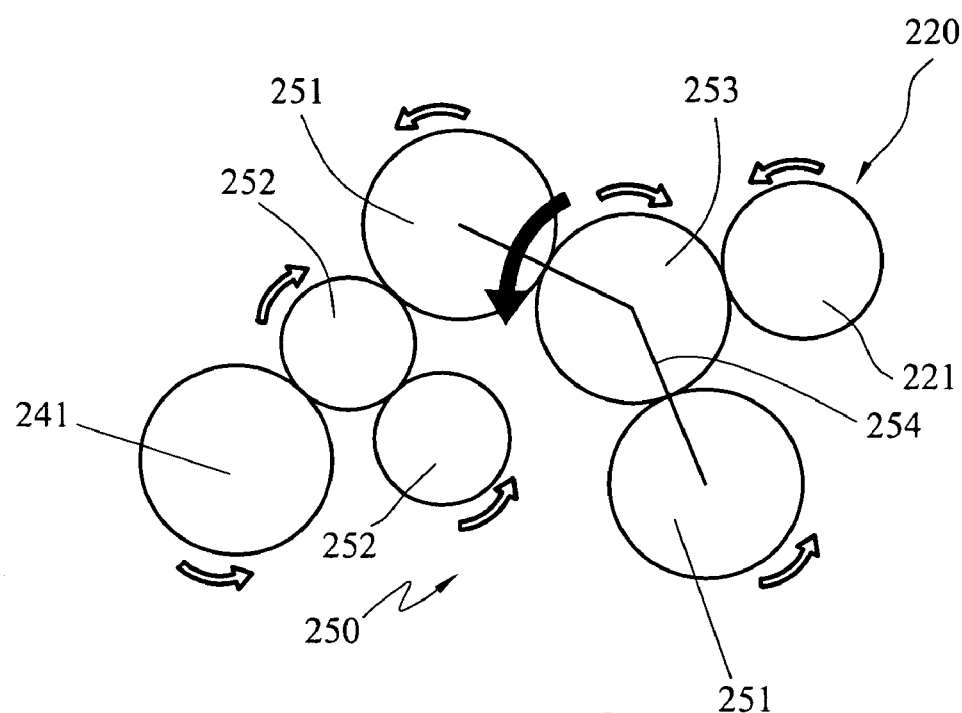
FIGS. 8A and 8B are schematic views of the operation of another type of the reverse driving assembly according to the embodiment of the present invention.
Figure 8B:
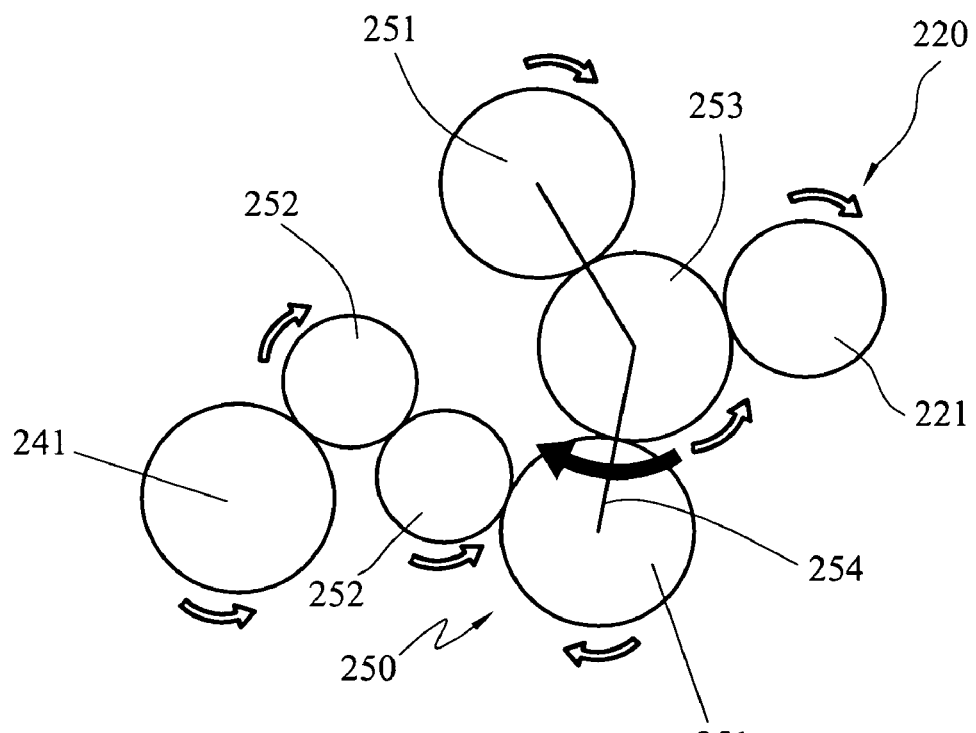

FIGS. 8A and 8B show an implementation of another type of the reverse driving assembly 250 according to an embodiment of the present invention. The reverse driving assembly 250 includes two first reverse gears 251, two second reverse gears 252, a driven gear 253, and a gear seat 254. The driven gear 253 and the gear seat 254 are coaxially pivotally connected to the base 100, and the driven gear 253 is constantly connected to the driving device 130 through the power transmission assembly 220. Meanwhile, the two first reverse gears 251 are pivotally connected to the gear seat 254, and are engaged with the driven gear 253 respectively. The two second reverse gears 252 are pivotally connected to the base 100 and are engaged with each other, such that the rotational directions of the two second reverse gears 252 are opposite. Moreover, one of the two second reverse gears 252 is constantly engaged with the paper conveying roller assembly, while the other one of the two second reverse gears 252 is not directly engaged with the paper conveying roller assembly.

As shown in FIG. 8A, when the driving device 130 rotates forward and drives the driven gear 253 through the power transmission assembly 220 to rotate forward, one side of the gear seat 254 is driven to swing toward the second reverse gear 252 engaged with the paper conveying roller assembly, such that the corresponding first reverse gear 251 is engaged with this second reverse gear 252 and is driven to rotate forward, so as to drive the paper conveying roller assembly to rotate forward to drive the paper sheet P to move forward.

As shown in FIG. 8B, when the driving device 130 rotates backward and drives the first reverse gear 251 through the power transmission assembly 220 to rotate backward, the other side of the gear seat 254 is driven to swing towards the second reverse gear 252 which is not directly engaged with the paper conveying roller assembly, such that the corresponding first reverse gear 251 is engaged with the second reverse gear 252 which is not directly engaged with paper conveying assembly 250, and drives it to rotate backward. At this time, the second reverse gear 252 engaged with the paper conveying roller assembly still rotates forward, and drives the paper pickup roller assembly 210 to rotate forward to drive the paper sheet P to move forward. That is, the reverse driving assembly 250 constantly forward drives the paper conveying roller assembly to rotate forward, no matter whether the driving device 130 rotates forward or backward.

The operation of the embodiment of the present invention is described in detail as follows. When the scanner or printer performs the one-side scanning or printing, the driving device 130 rotates forward (the clockwise direction in the figure), and the driven gear 253 of the reverse driving assembly 250 is driven to rotate counterclockwise through the power transmission assembly 220. At this time, the first reverse gear 251 and the two second reverse gears 252 engaged with the driven gear 253 are driven to move, such that the gear seat 254 rotates clockwise relative to the base 100, and the second reverse gear 252 of the second output end 250b is engaged with the paper conveying roller assembly. Then, the paper conveying roller assembly is driven to rotate forward, and the paper sheet P in the paper feeding track 110 is continuously conveyed from the entrance end 111 to the exit end 112.

Meanwhile, as the first clutch gear 231a of the one-way driving assembly 230 is engaged with the power transmission assembly 220, the first clutch gear 231 is driven to rotate clockwise, and the second clutch gear 231b and a free end of the arm 232 are driven to move toward the paper pickup roller assembly 210, such that the second clutch gear 231b is engaged with the paper pickup roller assembly 210, so as to drive the paper pickup roller assembly 210 to rotate and to pick up the paper sheet P from a paper tray connected to the entrance end 111 of the paper feeding track 110.

In addition, the one-way driving assembly 230 and the reverse driving assembly 250 are engaged with different reduction gears 221 in the power transmission assembly 220, so the paper pickup roller assembly 210 and the paper conveying roller assembly have different rotational speed. By setting the speed of the paper pickup roller assembly 210 conveying the paper sheet P to be lower than the speed of the paper conveying roller assembly conveying the paper P, the interval between two sequential paper sheets P is controlled, such that the edges of two sequential paper sheets P are not overlapped or interfered with one another. The power transmission assembly 220 is provided for connecting the one-way driving assembly 230 and the reverse driving assembly 250 to the driving device 130, and the rotational speed of the one-way driving assembly 230 is controlled to be different from the rotational speed of the reverse driving assembly 250. Therefore, the number of the reduction gears 221 can be configured at will. It is also allowed to use a single reduction gear 221 to connect the one-way driving assembly 230 to the reverse driving assembly 250, so as to realize the speed difference through the difference of the gear reduction ratios of the one-way driving assembly 230 and the reverse driving assembly 250.

Moreover, as the transparent partition 123 is disposed above the working area 120 to separate the area above the working area 120 into the first scanning area 121 and the second scanning area 122. When the paper sheet P with one side being scanned passes over the working area 120 through the second scanning area 122, the moving path thereof is not interfered with the moving path of another paper sheet P to be scanned in the first scanning area 121 and the paper sheet P to be scanned passes through the first scanning area 121. Therefore, the scanning is not be interfered by the paper sheet P in the second scanning area 122. Thus, the interval between two paper sheet P can be reduced, thereby improving the overall paper pickup and paper feeding speed. When one-side scanning is performed continuously, the paper sheet P can be conveyed in the paper feeding track 110 continuously without stopping or rotating back the driving device 130. Thus, the influence on the scanning caused by the overlapping of two paper sheets P in the working area 120 can be effectively prevented. As the driving device 130 continuously performs forward output without stopping or rotating backward to prevent the interference of the papers P, when one-side scanning of the paper sheet P is performed, the paper feeding speed higher than that of the paper conveying mechanisms in conventional double-side scanning or printing apparatuses can be obtained.

Figure 9:
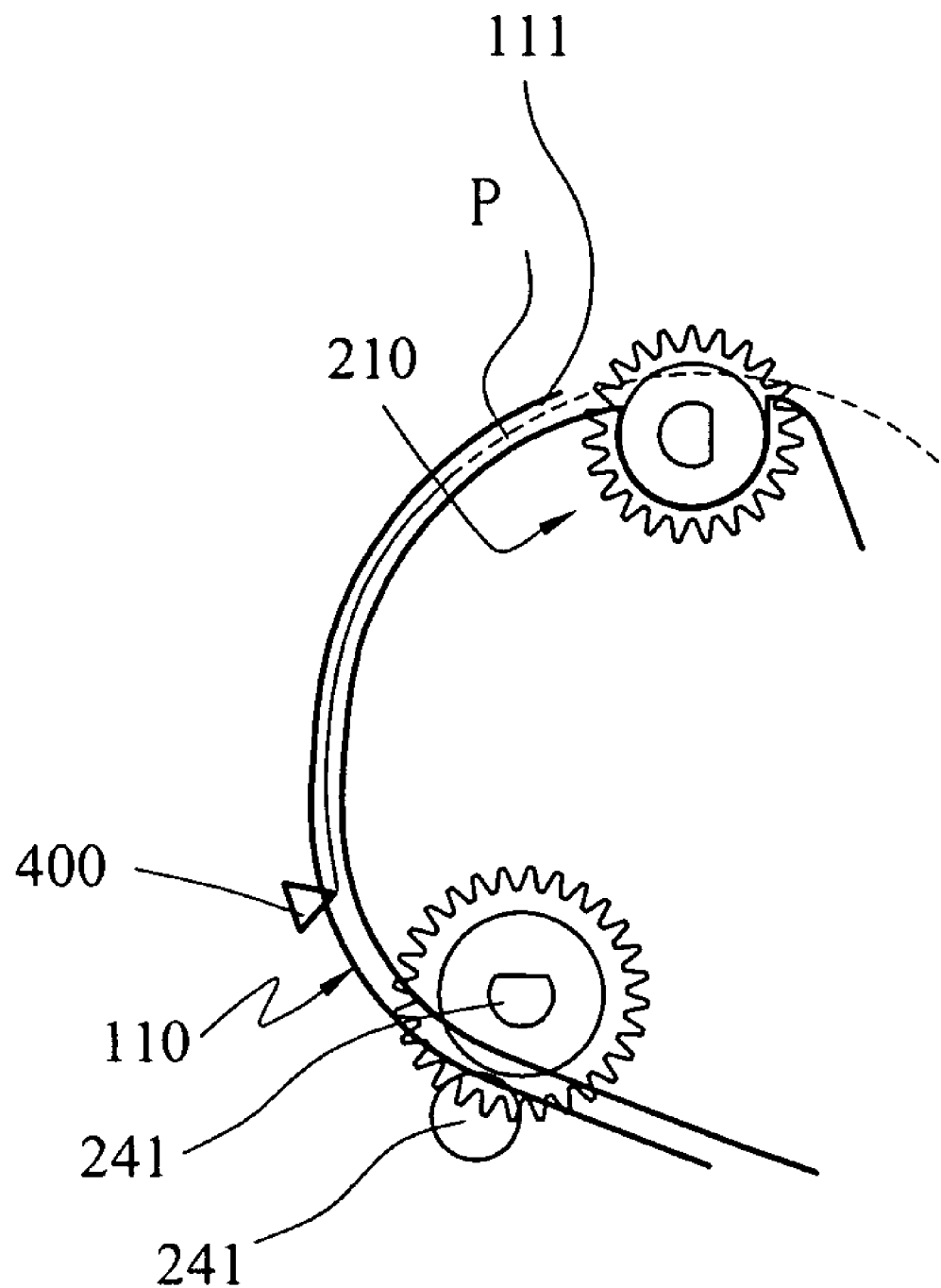
FIG. 9 is a schematic view of the operation of the sensor according to an embodiment of the present invention.

Referring to FIG. 9 with the aforementioned figures, when the double-side scanning is required, the driving device 130 rotates forward first to make the paper pickup roller assembly 210 pick up a paper sheet P from the paper tray and move it into the paper feeding track 110 via the entrance end 111. When the front edge of the paper sheet P arrives at the paper conveying roller assembly, a sensor 400 disposed in the paper feeding track 110 is triggered to make the driving device 130 to rotate backward. As shown in the figure, the driving device 130 starts to rotate counterclockwise.

Here, the first clutch gear 231 of the one-way driving assembly 230 rotates backward to drive the second clutch gear 232 to be disengaged from the paper pickup roller assembly 210, such that the one-way driving assembly 230 stops driving the paper pickup roller assembly 210 as the driving device 130 rotating backward. Therefore, the one-way driving assembly 230 is idle, and does not drive the paper pickup roller assembly 210, such that the paper pickup roller assembly 210 will not pick up another paper sheet P from the paper cassette before the doubled-side scanning is complete.

When the driven gear 253 of the reverse driving assembly 250 is driven by the power transmission assembly 220 and rotates backward, the gear seat 254 rotates counterclockwise relative to the base 100, such that the second reverse gear 252 of the second output end 250b is disengaged from the paper conveying roller assembly. Then, the first reverse gear 251 of the first output end 250a is driven by the power transmission assembly 220 to move, and is engaged with the paper conveying roller assembly. As the first reverse gear 251 and the second reverse gear 252 having rotational outputs in opposite directions, though the rotational direction of the driving device 130 changes, the paper conveying roller assembly can still be driven to rotate forward by the reverse driving assembly 250, and the paper sheet P with both sides to be scanned is driven to move forward continuously in the paper feeding track 110. Thus, the paper sheet P passes through the first scanning area 121 of the working area 120 via the entrance section 113, with the first side P1 facing the working area 120 for being scanned. Then, the paper sheet P entering flipping section 114 is flipped, and returns to the working area 120. The paper sheet P passes over the working area 120 through the second scanning area 121, with the second side P2 of the paper sheet P facing the working area 120 for being scanned. Finally, the paper sheet P enters the exit section 115, such that the paper sheet P leaves the paper feeding track 110 via the exit end 112.

Then, the driving device 130 rotates forward, such that the one-way transmission assembly 230 is engaged with the paper pickup roller assembly 210 again. Meanwhile, the first output end 250a of the reverse driving assembly 250 is disengaged from the paper conveying roller assembly, such that the second reverse gear 252 of the second output end 250b is engaged with the paper conveying roller assembly again, and the paper conveying roller assembly still keeps rotating forward to drive the paper sheet P to move forward. Here, the paper feeding apparatus according to the embodiment of the present invention can perform the next paper pickup and conveying operation. By controlling the driving device 130 to rotate forward or backward according to the requirement of one-side scanning or double-side scanning, the respective paper pickup and conveying actions can be controlled by only one driving device 130.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A paper feeding apparatus, disposed on a base including a paper feeding track defined therein, a driving device being disposed in the base for driving the paper feeding apparatus, the feeding apparatus comprising:
   a paper pickup roller assembly, for picking up a paper sheet into the paper feeding track;
   a one-way driving assembly, connected to the driving device and driven by the driving device, the one-way driving assembly being engaged with the paper pickup roller assembly only in one direction to drive the paper pickup roller assembly forward as the driving device rotates forward and stop driving the paper pickup roller assembly as the driving device rotates backward, the one-way driving assembly comprising:
      an arm, with one end pivotally connected to the base for swinging relative to the base; and
      a plurality of clutch gears, pivotally connected to the arm and engaged with one another, the clutch gears comprising a first clutch gear and a second clutch gear, the first clutch gear being connected to the driving device, the first clutch gear and the arm being coaxially connected to the base, the second clutch gear being engaged with the first clutch gear and being selectively engaged with the paper pickup roller assembly along with the swinging of the arm, wherein the arm selectively swings to make the paper pickup roller assembly engaged or disengaged with the clutch gears;
   a paper conveying roller assembly, disposed along the paper feeding track for conveying the paper sheet to move forward in the paper feeding track; and
   a reverse driving assembly, connected to the driving device and driven by the driving device, for constantly driving the paper conveying roller assembly to rotate forward, the reverse driving assembly driving the paper conveying roller assembly to rotate forward to convey the paper sheet forward as the driving device rotates forward, and the reverse driving assembly driving the paper conveying roller assembly to rotate forward to convey the paper sheet forward as the driving device rotates backward.

2. The paper feeding apparatus as claimed in claim 1, wherein the reverse driving assembly comprises a first output end and a second output end that have rotational outputs in opposite directions, and the first output end and the second output end are alternately engaged with the paper conveying roller assembly for constantly driving the paper conveying roller assembly to rotate forward.

3. The paper feeding apparatus as claimed in claim 2, wherein the reverse driving assembly further comprises:
   a gear seat, pivotally connected to the base for swinging relative to the base;
   a driven gear, pivotally connected to base and connected to the driving device, wherein the driven gear and the gear seat are coaxially connected to the base;
   a first reverse gear, pivotally connected to the gear seat and engaged with the driven gear, to serve as the first output end of the reverse driving assembly; and
   a plurality of second reverse gears, pivotally connected to the gear seat and engaged with one another, wherein one of the second reverse gears is engaged with the driven gear, and at least one of the second reverse gears rotates in the direction opposite to the first reverse gear does, to serve as the second output end of the reverse driving assembly.

4. The paper feeding apparatus as claimed in claim 1, wherein the reverse driving assembly comprises:
   a gear seat, pivotally connected to the base for swinging relative to the base;
   a driven gear, pivotally connected to the base, and connected to the driving device, wherein the driven gear and the gear seat are coaxially connected to the base;
   two first reverse gears, pivotally connected to the gear seat, and engaged with the driven gear respectively; and
   a plurality of second reverse gears, pivotally connected to the gear seat and engaged with one another, wherein one of the second reverse gears is constantly engaged with the paper conveying roller assembly;
   wherein the driven gear drives the gear seat to swing to make one of the two first reverse gears engaged with one of the second reverse gears, or another one of the first reverse gears engaged with another one of the second reverse gears, thus driving the paper conveying roller assembly to constantly rotate forward.

5. The paper feeding apparatus as claimed in claim 1, further comprising a power transmission assembly, for connecting the one-way driving assembly and the reverse driving assembly to the driving device.

6. The paper feeding apparatus as claimed in claim 5, wherein the power transmission assembly comprises a plurality of reduction gears with different reduction ratios, and the one-way driving assembly and the reverse driving assembly are engaged with one of the reduction gears respectively, such that the rotational speed of the one-way driving assembly is different than the rotational speed of the reverse driving assembly.

7. The paper feeding apparatus as claimed in claim 5, wherein the power transmission assembly is a reduction gear, and the one-way driving assembly and the reverse driving assembly have different gear ratios, such that a difference exists between the rotational speed of the one-way driving assembly and the rotational speed of the reverse driving assembly.

8. The paper feeding apparatus as claimed in claim 1, wherein the speed of the paper conveying roller assembly conveying the paper sheet is greater than the speed of the paper pickup roller assembly conveying the paper sheet.

9. The paper feeding apparatus as claimed in claim 1, wherein the reverse driving assembly further comprises:
- a gear seat, pivotally connected to the base for swinging relative to the base;
- a driven gear, pivotally connected to base, wherein the driven gear and the gear seat are coaxially connected to the base;
- a first reverse gear, pivotally connected to the gear seat, and engaged with the driven gear, to serve as the first output end of the reverse driving assembly; and
- a plurality of second reverse gears, pivotally connected to the gear seat and engaged with one another, wherein one of the second reverse gears is engaged with the driven gear, and at least one of the second reverse gears rotates in the direction opposite to the first reverse gear does, to serve as the second output end of the reverse driving assembly.

10. A paper feeding apparatus, disposed on a base, a driving device being disposed in the base for driving the paper feeding apparatus, the paper feeding apparatus comprising:
- a paper feeding track defined within the base, passing through a working area, the paper feeding track comprising an entrance section, a flipping section, and an exit section; one end of the entrance section being for a paper sheet to enter, and the other end being connected to the working area; one end of the exit section being connected to the working area, and the other end being for the paper sheet to leave the paper feeding track; and two ends of the flipping section being connected to the working area to serve as a return path for the paper sheet;
- a paper pickup roller assembly, for picking up a paper sheet into the paper feeding track;
- a one-way driving assembly, connected to the driving device and driven by the driving device, the one-way driving assembly being engaged with the paper pickup roller assembly only in one direction to drive the paper pickup roller assembly forward as the driving device rotates forward and stop driving the paper pickup roller assembly as the driving device rotates backward, the one-way driving assembly comprising:
  - an arm, with one end pivotally connected to the base for swinging relative to the base; and
  - a plurality of clutch gears, pivotally connected to the arm and engaged with one another, one of the clutch gears being engaged with the driving device, the arm selectively swinging to make the paper pickup roller assembly engaged or disengaged with the clutch gears;
- a paper conveying roller assembly, disposed along the paper feeding track for conveying the paper sheet to move forward in the paper feeding track; and
- a reverse driving assembly, connected to the driving device and driven by the driving device, for constantly driving the paper conveying roller assembly to rotate forward, the reverse driving assembly driving the paper conveying roller assembly to rotate forward to convey the paper sheet forward as the driving device rotates forward, and the reverse driving assembly driving the paper conveying roller assembly to rotate forward to convey the paper sheet forward as the driving device rotates backward, wherein the reverse driving assembly comprises a first output end and a second output end that have rotational outputs in opposite directions, and the first output end and the second output end are alternately engaged with the paper conveying roller assembly, assembly for constantly driving the paper conveying roller assembly to rotate forward.

11. The paper feeding apparatus as claimed in claim 10, further comprising a transparent partition disposed in the working area for separating the area above the working area into a first scanning area and a second scanning area, such that two ends of the flipping section are connected to the entrance section and the exit section respectively.

12. The paper feeding apparatus as claimed in claim 10, wherein the reverse driving assembly comprises:
- a gear seat, pivotally connected to the base for swinging relative to the base;
- a driven gear, pivotally connected to the base, and connected to the driving device, wherein the driven gear and the gear seat are coaxially connected to the base;
- two first reverse gears, pivotally connected to the gear seat, and engaged with the driven gear respectively; and
- a plurality of second reverse gears, pivotally connected to the gear seat and engaged with one another, wherein one of the second reverse gears is constantly engaged with the paper conveying roller assembly;
- wherein the driven gear drives the gear seat to swing to make one of the two first reverse gears engaged with one of the second reverse gears, or another one of the first reverse gears engaged with another one of the second reverse gears, thus driving the paper conveying roller assembly to constantly rotate forward.

13. The paper feeding apparatus as claimed in claim 10, wherein the speed of the paper conveying roller assembly conveying the paper sheet is greater than the speed of the paper pickup roller assembly conveying the paper sheet.

* * * * *